US012749501B2

(12) United States Patent
Kimura et al.

(10) Patent No.: US 12,749,501 B2
(45) Date of Patent: Sep. 29, 2026

(54) MAGNETIC RECORDING DEVICE

(71) Applicants: Kabushiki Kaisha Toshiba, Tokyo (JP); Toshiba Electronic Devices & Storage Corporation, Tokyo (JP)

(72) Inventors: Kaori Kimura, Yokohama Kanagawa (JP); Takao Furuhashi, Kawasaki Kanagawa (JP); Toru Watanabe, Kawasaki Kanagawa (JP)

(73) Assignees: Kabushiki Kaisha Toshiba, Kawasaki (JP); Toshiba Electronic Devices & Storage Corporation, Kawasaki (JP)

( * ) Notice: Subject to any disclaimer, the term of this patent is extended or adjusted under 35 U.S.C. 154(b) by 0 days.

(21) Appl. No.: 19/179,823

(22) Filed: Apr. 15, 2025

(65) Prior Publication Data

US 2026/0171115 A1 Jun. 18, 2026

(30) Foreign Application Priority Data

Dec. 17, 2024 (JP) ................................ 2024-220992

(51) Int. Cl.
*G11B 5/41* (2006.01)
*G11B 5/00* (2006.01)

(52) U.S. Cl.
CPC ........ *G11B 5/41* (2013.01); *G11B 2005/0021* (2013.01)

(58) Field of Classification Search
CPC .......................... G11B 5/41; G11B 2005/0021
See application file for complete search history.

(56) References Cited

U.S. PATENT DOCUMENTS 6,084,753 A * 7/2000 Gillis ........................ G11B 5/41 360/99.18
6,411,083 B1 * 6/2002 Inaba ..................... G11B 27/34 324/210
9,601,140 B1 3/2017 Rajauria
9,852,574 B2 12/2017 Zoltewicz et al.
9,858,953 B1 1/2018 Johnson
9,916,847 B1 * 3/2018 Granz .................... G11B 5/455
10,199,067 B1 2/2019 Gan et al.
10,410,660 B1 9/2019 Hutchinson et al.
(Continued)

FOREIGN PATENT DOCUMENTS

JP 2020187815 A 11/2020
JP 2021047951 A 3/2021
(Continued)

OTHER PUBLICATIONS

U.S. Appl. No. 18/922,977, filed Oct. 22, 2024.

*Primary Examiner* — Andrew Sasinowski
(74) *Attorney, Agent, or Firm* — Kim & Stewart LLP

(57) ABSTRACT

According to one embodiment, a magnetic recording device includes a disk-shaped recording medium including a recording surface on which a lubricant is applied, a magnetic head including a recording element, a light source, and a light emitting element which irradiates light onto the recording surface of the recording medium, and a controller including a light source control circuit which controls a drive current value of the light source, a cleaning execution circuit which executes a cleaning operation to remove a build-up product attached to the magnetic head, and a setting circuit which sets a cleaning interval at which the cleaning operation is executed.

11 Claims, 8 Drawing Sheets

(56) References Cited

U.S. PATENT DOCUMENTS

| | | | | |
|---|---|---|---|---|
| 10,529,364 | B2 | 1/2020 | Brand et al. | |
| 12,223,988 | B1 | 2/2025 | Kimura | |
| 2013/0201580 | A1* | 8/2013 | Hirashima | G11B 5/41 360/75 |
| 2016/0329074 | A1 | 11/2016 | Karis et al. | |
| 2016/0364945 | A1 | 12/2016 | Zoltewicz et al. | |
| 2017/0221511 | A1 | 8/2017 | Dai et al. | |
| 2018/0233168 | A1 | 8/2018 | Brand et al. | |
| 2020/0365183 | A1 | 11/2020 | Matsumoto | |
| 2021/0090605 | A1 | 3/2021 | Suzuki et al. | |
| 2021/0201941 | A1 | 7/2021 | Hyodo | |
| 2021/0256996 | A1 | 8/2021 | Ohtake et al. | |
| 2021/0287701 | A1 | 9/2021 | Kudo | |
| 2022/0051693 | A1 | 2/2022 | Hyodo | |
| 2023/0063493 | A1 | 3/2023 | Matsumoto et al. | |
| 2024/0096349 | A1 | 3/2024 | Isokawa et al. | |
| 2024/0321293 | A1 | 9/2024 | Matsumoto | |
| 2024/0321312 | A1 | 9/2024 | Kimura et al. | |
| 2025/0046338 | A1 | 2/2025 | Furuhashi | |

FOREIGN PATENT DOCUMENTS

| | | | |
|---|---|---|---|
| JP | 2021106063 | A | 7/2021 |
| JP | 2021131918 | A | 9/2021 |
| JP | 2021149978 | A | 9/2021 |
| JP | 2022032269 | A | 2/2022 |
| JP | 2023031619 | A | 3/2023 |
| JP | 2024044496 | A | 4/2024 |
| JP | 2024134253 | A | 10/2024 |
| JP | 2024135927 | A | 10/2024 |
| JP | 2025044548 | A | 4/2025 |
| JP | 2025173146 | A | 11/2025 |

* cited by examiner

MAGNETIC RECORDING DEVICE

CROSS-REFERENCE TO RELATED APPLICATIONS

This application is based upon and claims the benefit of priority from Japanese Patent Application No. 2024-220992, filed Dec. 17, 2024, the entire contents of which are incorporated herein by reference.

FIELD

Embodiments described herein relate generally to a magnetic recording device.

BACKGROUND

As a magnetic recording device, such a type that uses a magnetic head of the heat-assisted magnetic recording (HAMR) mode has been proposed. The HAMR is a technology that increases the recording capacity by heating the recording medium using a laser during recording.

In HAMR, due to the rise in temperature of the recording medium, a product made up of components present on the recording medium adheres between the light-emitting element of the magnetic head and the recording medium, and a hardened substance is formed (hereinafter referred to as a "build-up" product). This build-up product functions as a layer that increases the thermal conductivity efficiency of the laser. Therefore, the temperature of the recording medium can be increased without increasing the laser output.

The amount of build-up generated may depend on the environment and the ratio of Si-based materials contained in the recording medium. However, Si-based materials such as siloxanes cause smearing (contamination) of the magnetic head. For example, if a large amount of build-up product adheres to the magnetic head, there is a possibility of causing a fault between the magnetic head and the recording medium.

DETAILED DESCRIPTION

Various embodiments will be described hereinafter with reference to the accompanying drawings. In general, according to one embodiment, a magnetic recording device comprises a disk-shaped recording medium including a recording surface on which a lubricant is applied, a magnetic head including a recording element, a light source, and a light emitting element which irradiates light onto the recording surface of the recording medium, and a controller including a light source control circuit which controls a drive current value of the light source, a cleaning execution circuit which executes a cleaning operation to remove a build-up product attached to the magnetic head, and a setting circuit which sets a cleaning interval at which the cleaning operation is executed.

Note that the disclosure is merely an example, and proper changes in keeping with the spirit of the invention, which are easily conceivable by a person of ordinary skill in the art, come within the scope of the invention as a matter of course. In addition, in some cases, in order to make the description clearer, the drawings show schematic illustration rather than as an accurate representation of what is implemented. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

First Embodiment

Figure 1:
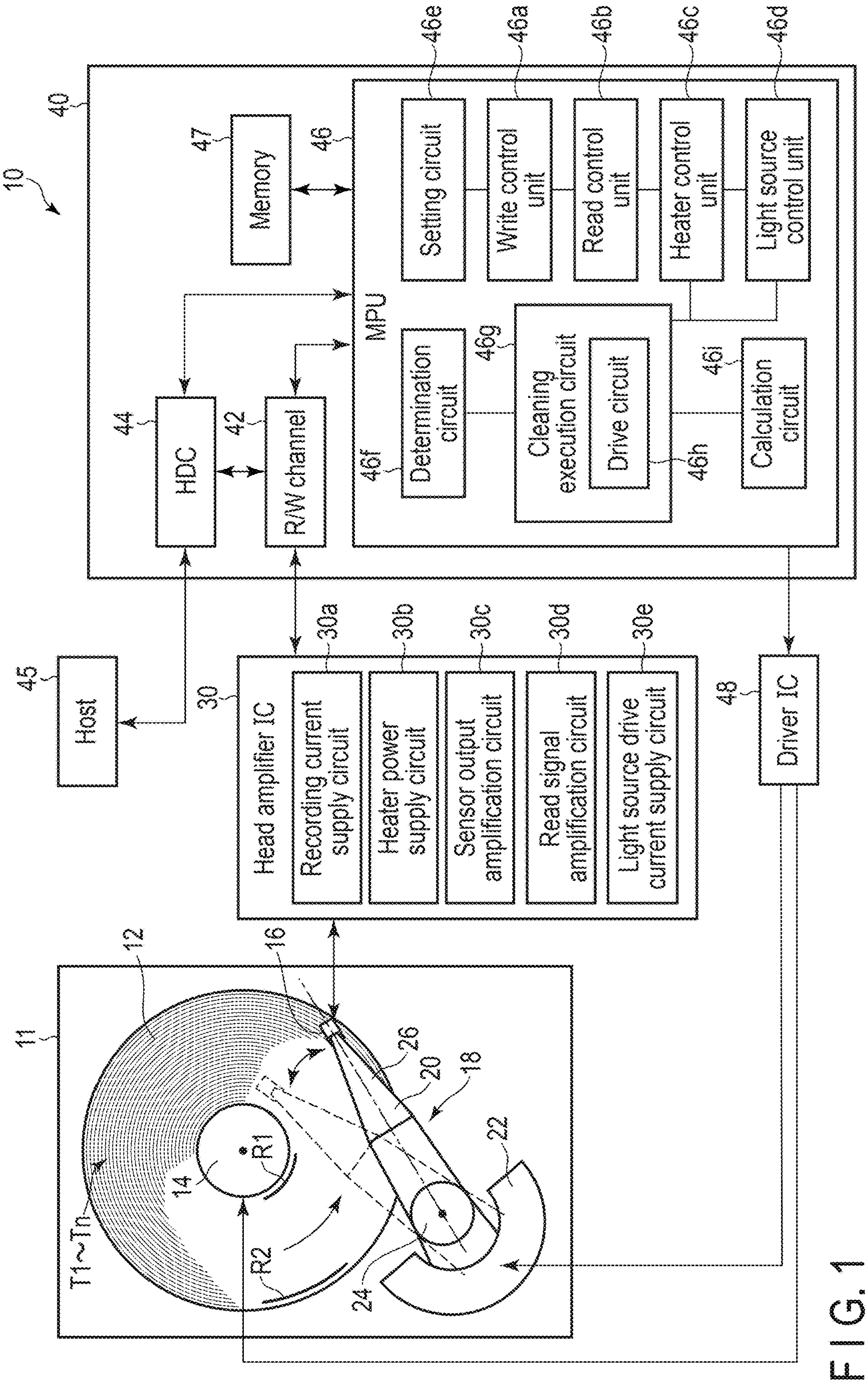
FIG. 1 is a block diagram schematically showing a hard disk drive (HDD) according to the first embodiment.
Figure 2:
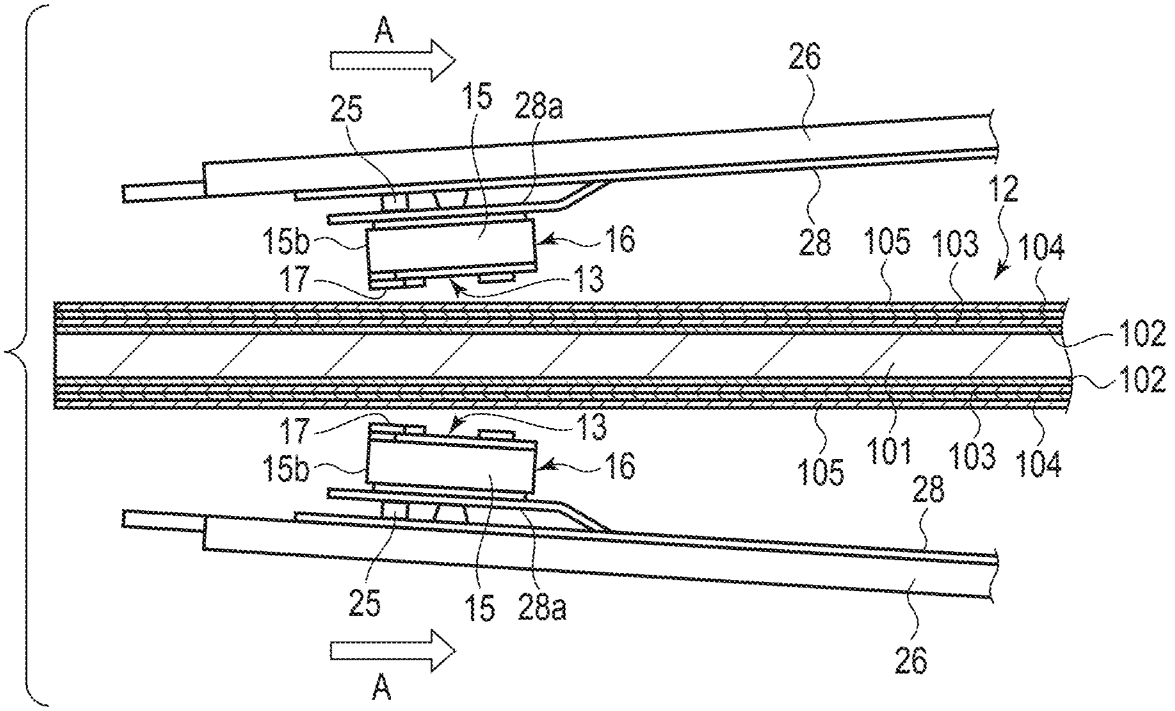
FIG. 2 is a side view schematically showing magnetic heads, a suspension and a magnetic disk in the HDD.

As an example of the magnetic recording devices, a hard disk drive (HDD) according to the first embodiment will be described in detail. FIG. 1 is a block diagram schematically showing an HDD according to the first embodiment, and FIG. 2 is a side view showing magnetic heads in a flying state and a magnetic disk.

As shown in FIG. 1, an HDD 10 comprises a rectangular-shaped housing 11, a magnetic disk 12 as a recording medium disposed in the housing 11, a spindle motor 14 that supports and rotates the magnetic disk 12, and a plurality of magnetic heads 16 that performs recording (write) and reproducing (read) of data with respect to the magnetic disk 12. The HDD 10 comprises a head actuator 18 that moves the magnetic head 16 to an arbitrary track on the magnetic disk 12 and positions the head. The head actuator 18 includes a carriage assembly 20 that supports the magnetic head 16 in a movable manner and a voice coil motor (VCM) 22 that rotates the carriage assembly 20.

The HDD 10 comprises a controller that includes a head amplifier IC 30 that drives the magnetic head 16, a main controller 40, and a driver IC 48. The head amplifier IC 30 is provided, for example, in the carriage assembly 20 and is electrically connected to the magnetic heads 16. The head amplifier IC 30 includes a recording current supply circuit (recording current supply unit) **30*a* that supplies a recording current to a recording coil of the magnetic head 16, a heater power supply circuit 30*b* that supplies drive power to the thermal actuator (heater) of the magnetic head 16, which will be described later, a sensor output amplification circuit 30*c* that amplifies the detection signal of the heat resistance sensor HR, a read signal amplification circuit 30***d* that amplifies the signal read by the magnetic head 16, a light source drive current supply circuit 30*e* that supplies drive current to the laser oscillator, which will be described later, for example, a laser diode unit (LDU) and the like.

The main controller 40 and the driver IC 48 are configured on a control circuit board, which is not shown in the figure, for example, on a rear surface side of the housing 11. The main controller 40 comprises a read/write channel (R/W channel) 42, a hard disk controller (HDC) 44, a microprocessor (MPU) 46, a memory 47 and the like. The main controller 40 is electrically connected to the magnetic head 16 via the head amplifier IC 30. The main controller 40 is electrically connected to the VCM 22 and the spindle motor 14 via the driver IC 48. The HDC 44 can be connected to the host computer 45.

In the main controller 40, the MPU 46 includes a write control unit 46*a* that controls the write head, a read control unit 46*b* that controls the read head, a heater control unit 46*c* that controls the power supplied to the thermal actuator, a light source control unit 46*d* that controls the drive current of the light source, a setting circuit 46*e* that sets the light source drive current value (laser drive current setting value) IOP and the track pitch per inch (TPI) of the recording medium, a determination circuit 46*f* that sets the cleaning interval, a cleaning execution circuit 46*g* that executes cleaning, a drive circuit 46*h* included in the cleaning execution circuit 46*g*, a calculation circuit 46*i* that calculates the accumulated time of write operations for each magnetic head and the accumulated time of device operation time, and the like. As will be described later, in the memory 47, various data such as the set laser drive current setting value IOP, TPI, cleaning interval, accumulated operation time, and heater power setting value are stored.

The HDD 10 comprises a plurality of, for example, ten magnetic disks 12 (note that only one disk is shown in the figure). The magnetic disks 12 are coaxially fitted to the hub of the spindle motor 14. The magnetic disks 12 are rotated in the direction indicated by the arrow at a predetermined speed by the spindle motor 14.

As shown in FIGS. 1 and 2, the magnetic disks 12 are configured as perpendicular magnetic recording media. The magnetic disks 12 each includes a substrate 101 formed of a non-magnetic material into a discoidal shape. On upper and lower surfaces of the substrate 101, the heat sink layer 102, the crystal alignment layer 103, the magnetic recording layer 104 having magnetic anisotropy in a direction perpendicular to the surface of the magnetic disk 12, and the protective layer 105 on a surface of which a lubricant is applied are stacked one on another in order. The crystal alignment layer 103 is provided to improve the alignment properties of the magnetic recording layer 104. The heat sink layer 102 is disposed under the crystal alignment layer 103 so as to suppress the expansion of the heating area. Note here that the magnetic disks 12 each contains a Si-based material, for example, SiOx.

As shown in FIG. 1, on each of the surfaces (magnetic recording layers) of the magnetic disk 12, a plurality of concentric recording tracks T1 to Tn are formed. Each of the recording tracks T1 to Tn includes a plurality of sectors arranged along a circumferential direction. As will be described later, the track density (track per inch: TPI) of each magnetic disk 12 is set so that the areal recording density of the magnetic disk is maximized.

The carriage assembly 20 includes a bearing unit 24 that is supported to be rotatable by the housing 11, and a plurality of arms and suspensions 26 that extend from the bearing unit 24. As shown in FIG. 2, each magnetic head 16 is supported at an extending end of the respective suspension 26. The magnetic heads 16 are electrically connected to the head amplifier IC 30 via wiring members (flexures) 28 provided in the carriage assembly 20.

As shown in FIG. 2, the magnetic heads 16 are each configured as a flying type head and includes a slider 15 formed into a substantially rectangular parallelopiped shape and a head portion 17 formed at an end portion on a slider 15 side of the outflow end (trailing end) 15*b* of the slider 15. The slider 15 is formed, for example, from a sintered body of alumina and titanium carbide (Altic), and the head portion 17 is formed from a plurality of layers of thin film. The slider 15 is attached to a gimbal portion 28*a* of the wiring member 28.

The slider 15 has a disk opposing surface (air bearing surface (ABS)) 13 of substantially a rectangular shape opposing the surface of the magnetic disk 12, and a rear surface attached to the gimbal portion 28*a*. To the rear surface of the slider 15, a laser oscillator such as a laser diode unit (LDU) 25 is fixed, which functions as a light source. The slider 15 is maintained in a state where it flies above a predetermined amount from the surface of the magnetic disk 12 by the air flow generated between the disk surface and the ABS 13 due to the rotation of the magnetic disk 12. As the magnetic disk 12 rotates, the magnetic head 16 travels in the direction indicated by the arrow A (head travel direction), with respect to the magnetic disk 12, that is, in the direction opposite to the rotating direction of the disk.

Figure 3:
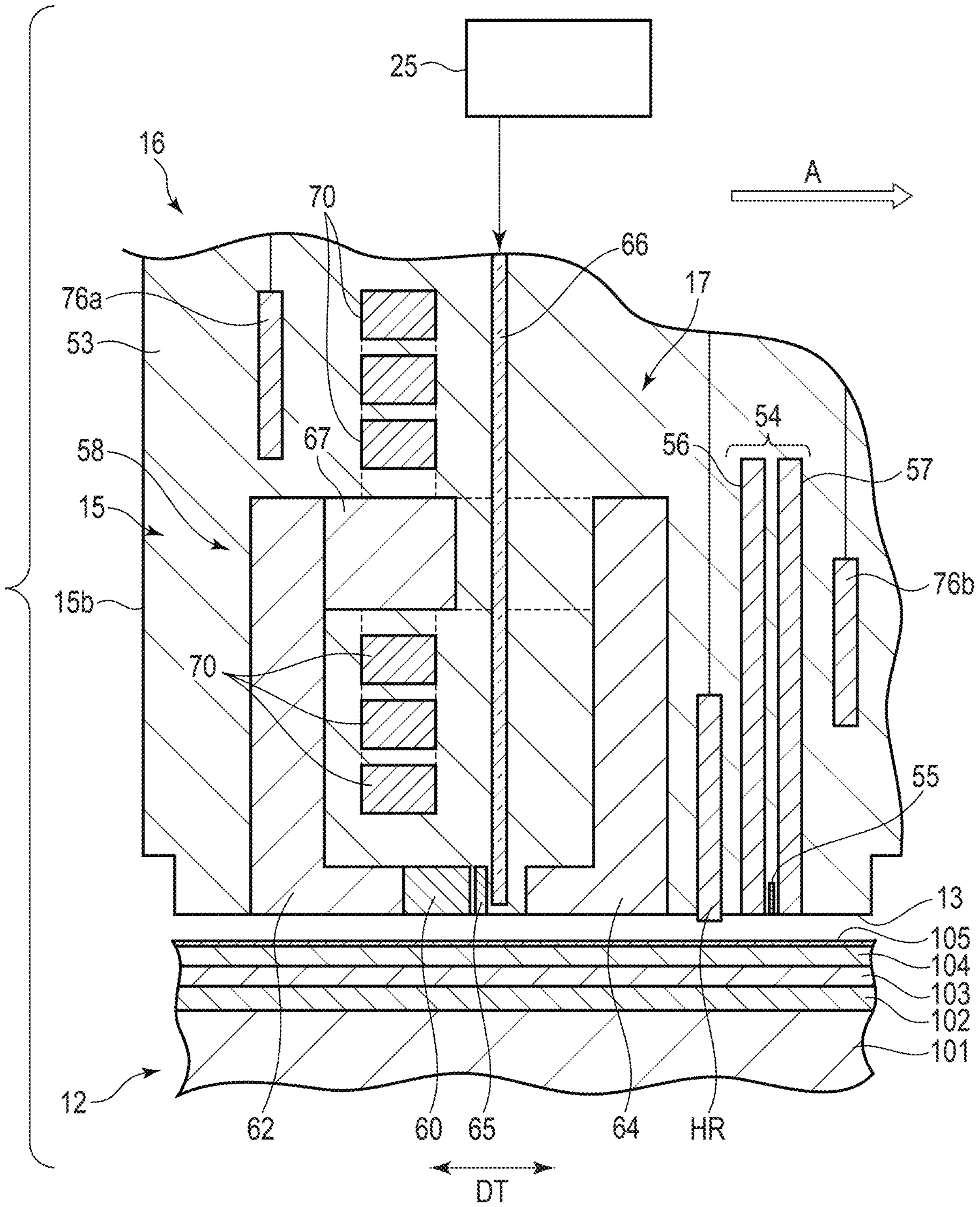
FIG. 3 is an enlarged cross-sectional view showing a head portion of the magnetic head.

FIG. 3 is an enlarged cross-sectional view showing the head portion 17 of the magnetic head 16 and the magnetic disk 12.

As shown in FIG. 3, the head portion 17 includes a read head (, which may be referred to as a reproduction element in some cases) 54 and a write head (, which may be referred to as a recording element in some cases) 58, formed by a thin film process on the trailing end 15*b* of the slider 15. The read head 54 and the write head 58 are covered by a non-magnetic protective insulating film 53, except for the part exposed to the ABS 13 of the slider 15. The protective insulating film 53 constitutes the outline shape of the head portion 17. Further, the head portion 17 includes a light emitting element that irradiates light onto the surface of the magnetic disk, which is, here, a near-field light-emitting element, a waveguide 66 that propagates the laser light oscillated by the LDU 25 to the near-field light-emitting element 65, a heat resistance sensor HR that detects contact with the surface of the magnetic disk, a first thermal actuator that controls the protrusion amount of the write head 58, and a second thermal actuator that controls the protrusion amount of the read head 54.

The longitudinal direction (circumferential direction) of the recording track formed in the magnetic recording layer 104 of the magnetic disk 12 is defined as a track direction DT, and the width direction of the recording track that is orthogonal to the longitudinal direction is defined as a cross track direction.

The read head 54 includes a magnetic film 55 that exhibits a magnetoresistive effect, and shield films 56 and 57 disposed to sandwich the magnetic film 55 on the trailing side and leading side of the magnetic film 55. The magnetic film 55 and the shield films 56 and 57 extend substantially perpendicular to the ABS 13. The lower ends of the magnetic film 55 and the shielding films 56 and 57 are exposed to the ABS 13 of the slider 15.

The write head 58 is provided on the trailing end 15*b* side of the slider 15, relative to the read head 54. The write head 58 includes a main pole 60 that generates a recording magnetic field perpendicular to the surface of the magnetic disk 12, a trailing yoke 62 made of soft magnetic material that is bonded to the trailing side of the main pole 60 and passes magnetic flux to the main pole 60, a return shield pole 64 made of soft magnetic material that is disposed to oppose the main pole 60 with a write gap on the leading side thereof, and a junction 67 that physically joints the upper part of the trailing yoke 62 to the return shield pole 64, and a recording coil 70 arranged to be wound around the magnetic path including the trailing yoke 62 and the return shield pole 64 in order to pass magnetic flux to the main pole 60.

The distal end surface of the main pole 60, the distal end surface of the trailing yoke 62, the distal end of the near-field light-emitting element 65, and the distal end surface of the return shield pole 64 are exposed to the ABS 13 of the slider 15.

The main pole 60 is formed of a soft magnetic material having high permeability and high saturation magnetic flux density, and extends substantially perpendicular to the ABS 13. The main pole 60 includes a distal end surface exposed to the ABS 43 and a pole end surface opposing the near-field light-emitting element 65, which extends upward from the ABS 13, that is, in the direction away from the ABS 13.

The near-field light-emitting element (plasmon generator, near-field transducer) 65 is provided between the main pole 60 and the return shield pole 64, so as to oppose parallel to the pole end surface of the main pole 60 with a gap (gap length) therebetween. The end of the near-field light-emitting element 65 on an ABS 13 side is formed parallel to and flush with the ABS 13.

It is preferable that the near-field light-emitting element 65 should be formed of Au, Pd, Pt, Rh, or Ir, or an alloy constituted by any combination of some of these. Between the main pole 60 and the near-field light-emitting element 65, an insulating layer is interposed. This insulating layer should preferably be of an oxide such as $SiO_2$, $Al_2O_3$ or the like.

The waveguide 66 extends from the ABS 13 to the rear surface of the slider 15, that is, the end surface on the suspension side, and is optically connected to the LDU 25. The end portion (extending end) on the ABS 13 side of the waveguide 66 opposes substantially parallel to the near-field light-emitting element 65. Between the waveguide 66 and the near-field light-emitting element 65, an insulating layer is interposed.

The first thermal actuator includes, for example, a heater 76*a* as a heating element. The heater 76*a* is embedded in the protective insulating film 53 and is located near the write head 58. The second thermal actuator includes, for example, a heater 76*b* as a heating element. The heater 76*b* is embedded in the protective insulating film 53 and is located near the read head 54.

The heat resistance sensor HR is embedded in the protective insulating film 53 and is located between the write head 58 and the read head 54. The detecting end (distal end portion) of the heat resistance sensor HR is exposed to the ABS 13 or slightly protrudes therefrom. Note that the heat resistance sensor HR is used as an example of the head-disk interface (HDI) sensor.

The recording coil 70 is connected to the head amplifier IC 30 via the wiring lines and flexures 28, not shown in the figure. When writing signals to the magnetic disk 12, the recording current is supplied to the recording coil 70 from the recording current supply circuit 30*a* of the head amplifier IC 30, and thus the main pole 60 is excited and magnetic flux is made to flow in the main pole 60. The recording current supplied to the recording coil 70 is controlled by the write control unit 46*a* of the main controller 40.

The read head 54 is connected to the head amplifier IC 30 via the wiring lines and flexures 28, not shown in the figure. The signals read by the read head 54 is amplified by the read signal amplification circuit 30*d* of the head amplifier IC 30 and sent to the main controller 40.

The first heater 76*a* and the second heater 76*b* are connected to the head amplifier IC 30 via the wiring lines and flexures 28, respectively. Here, the drive power is applied from the heater power supply circuit 30*b* of the head amplifier IC 30 to the first heater 76*a* and the second heater 76*b*, and thus the heaters and the surroundings of the heaters are heated; therefore, the write head 58 or the read head 54 can be swelled out toward the magnetic disk 12. That is, by adjusting the amount of swelling, the flying height amount of the magnetic head 16 can be adjusted. The heater power supplied to the first heater 76*a* and the second heater 76*b* is controlled by the heater control unit 46*c* of the main controller 40.

The heat resistance sensor HR is connected to the head amplifier IC 30 via the wiring lines and the flexures 28. The detection signal (sensor output) of the heat resistance sensor HR is amplified by the sensor output amplification circuit 30*c* of the head amplifier IC 30 and sent to the MPU 46 of the main controller 40.

The LDU 25 is connected to the head amplifier IC 30 via the wiring lines and flexures 28, not shown in the figure. Here, as the drive power is applied from the light source drive current supply circuit 30*e* of the head amplifier IC 30, the LDU 25 oscillates laser light. The laser light is supplied to the near-field light-emitting element 65 through the waveguide 66. The current value of the drive current supplied to the LDU 25 is controlled by the light source control unit 46*d* of the main controller 40.

The laser power is usually controlled by setting the current value of the light source drive current supply circuit (pre-amplifier) 30*e*. The energy supplied to the LDU 25 is defined by the drive current: Itotal=Ith (or IB)+Ieff (or IOP) supplied from the light source drive current supply circuit 30*e*. Up to the base current value Ith, even when current is applied to the LDU 25, the laser oscillation does not occur. If a current value Ieff, which is a portion exceeding the value Ith, is applied, laser is oscillated from the LDU 25. When the thus oscillated laser light is propagated to the near-field light emitting element 65, near-field light is generated from the near-field light-emitting element 65 and irradiated on the magnetic disk 12. Thus, the magnetic disk 12 is regionally heated.

The base current value Ith varies depending on the environmental temperature and individual differences. Therefore, in the HDD 10, the base current value Ith is stored in the memory 47 as a device parameter IB, and the light source control unit 46*d* controls the laser power by changing the laser drive current setting value (Itotal−IB=IOP) corresponding to Ieff.

As shown in FIG. 1, in the HDD 10, by driving the VCM 22, the head actuator 18 is pivoted, and the respective magnetic head 16 is moved above the desired track on the magnetic disk 12 and then positioned at a location. As shown in FIG. 2, during operation of the HDD 10, the magnetic head 16 is placed to oppose the surface of the magnetic disk with a gap therebetween. The magnetic head 16 flies in an inclined position in which the write head 58 part of the head portion 17 is closest to the surface of the magnetic disk 12.

In this state, the read head 54 performs reading-out of recorded information with respect to the magnetic disk 12, and also the write head 58 performs writing of information (recording signals) (write operation).

Figure 4:
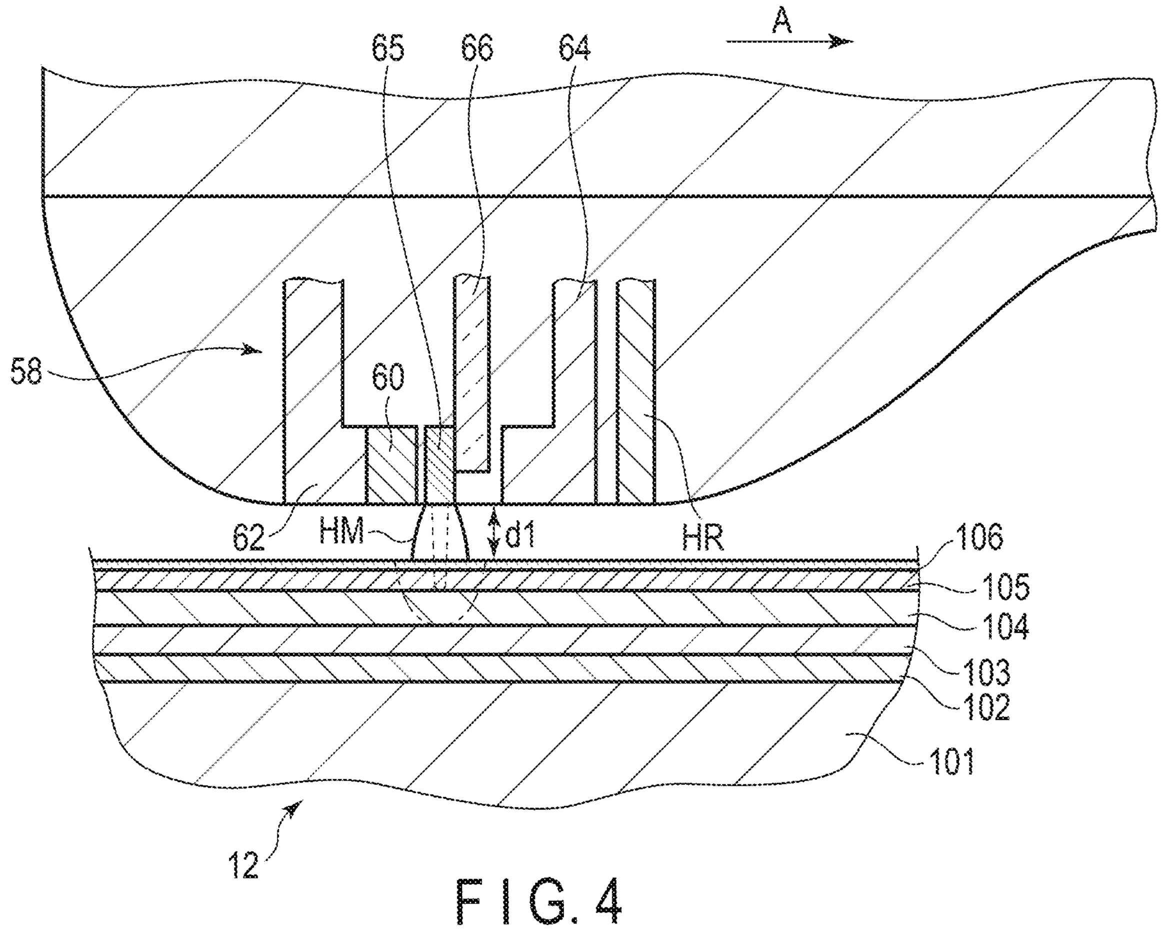
FIG. 4 is a diagram schematically showing the head portion of the magnetic head in the state where a write head portion is protruded by a thermal actuator.

FIG. 4 is a cross-sectional view schematically showing a part of each of the head portion 17 of the magnetic head 16 and the magnetic disk 12 during a write operation.

As shown in FIG. 4, during the write operation of the magnetic head 16, the drive power is applied to the first heater 76*a*, and thus the first heater 76*a* and its surroundings are heated, thus swelling the write head 58 portion toward the magnetic disk 12. Therefore, the gap (head flying height) d1 between the write head 58 and the surface of the magnetic disk 12 is set to about 5 to 0.1 nm.

In the write operation, a recording current is supplied from the recording current supply circuit 30*a* to the recording coil 70, and the main pole 60 is excited by the recording coil 70. Then, by applying a recording magnetic field in the perpendicular direction to the magnetic recording layer 104 of the magnetic disk 12 directly below the main pole 60, information is written to the magnetic recording layer 104 in a desired track width. Further, in the case of heat-assisted magnetic recording, during the writing operation, the drive current of a predetermined laser drive current setting value IOP is supplied from the light source drive current supply circuit 30*e* to the LDU 25, and thus laser light is emitted from the LDU 25. The laser light is supplied to the near-field light-emitting element 65 through the waveguide 66, and thus the near-field light-emitting element 65 generates near-field light and irradiates it onto the magnetic disk 12. The magnetic recording layer 104 of the magnetic disk 12 is regionally heated by the near-field light, thereby lowering the coercivity of the recording area. Then, a recording magnetic field from the main pole 60 is applied to this area where the coercivity is lowered, and thus the recording signal is written. In this way, high-density recording can be performed by locally heating the magnetic recording layer 104 and writing the recording signal in the area where the coercivity is sufficiently lowered.

On the other hand, when the magnetic head 16 with a flying height d1 travels over the protective layer 105, the lubricant is filled between a lubricant layer 106 applied onto the protective layer 105 and the distal end of the near-field light-emitting element 65. When the near-field light is irradiated onto the magnetic recording layer 104 and the lubricant layer 106 while maintaining the above-described state, the magnetic recording layer 104 and the lubricant are heated, and a build-up product HM is generated, which is constituted by hardened components present on the magnetic disk 12. The build-up product HM adheres to the tip of the near-field light-emitting element 65. Then, as the near-field light is irradiated for a predetermined period of time, the build-up product HM, which has a height d1 or less, adheres to the tip of the near-field light-emitting element 65. This build-up product HM functions as a layer that increases the thermal conductivity efficiency of the laser light (near-field light). In this manner, the temperature of the recording medium can be increased without increasing the laser output.

The components of the build-up product HM are materials that constitute lubricants and the magnetic disks, and in particular, the main component thereof is an oxide that is rich in Si, Ti, Ta, Al, C, Fe, Co or the like. The generation amount of the build-up product HM depends on the siloxanes contained in the environment and the elements contained in the magnetic disk 12, such as, firstly, Si and the like. When the amount of Si or the like is large, the build-up product HM generated becomes large in size. According to the HDD 10 of this embodiment, the main controller 40 monitors the time until the build-up product HM is generated, and measures the correlation between the generation time and the generation height of the product HM. The results of the measurement are registered in the memory 47 as generation time data.

As described above, silicon-based materials such as siloxanes cause smear (contamination) which adheres to the ABS 13 of the magnetic head 16. When the build-up product HM is enlarged, there is a possibility of causing a fault between the magnetic head 16 and the magnetic disk 12. Therefore, the HDD 10 of this embodiment is configured to perform periodic cleaning and regeneration of the build-up product. In the following, the operation of the HDD 10, including the cleaning operation and the setting of the cleaning interval will be described.

In the HDD 10, the setting circuit 46*e* of the main controller 40 sets the interval of performing the cleaning of the build-up product HM, that is, the cleaning interval, in advance based on the laser drive current setting value IOP of the LDU 25 or the track density TPI, and stores it in the memory 47.

The laser drive current setting value IOP and track density TPI described above are determined during the manufacturing and adjustment processes of the HDD 10. Normally, with the track density TPI and bit per inch (BPI), the areal recording density of the magnetic disk 12 is determined, and the TPI and BPI that maximize the areal recording density are set. In the HDD 10 of this embodiment, the optimal value of the laser drive current setting value IOP is adjusted at the same time as the TPI and BPI, and the optimized value is stored in the memory 47 as a device parameter.

For the same magnetic head, magnetic disk, and the distance between the same magnetic head and magnetic disk, when the laser drive current setting value IOP is increased, the spot diameter of the laser light becomes larger. That is, as the spot diameter increases, the magnetic recording pattern (recording track width) enlarges, and the recording density decreases. Further, the spot diameter of the laser light and the diameter of the build-up product are proportional to each other. Therefore, as the spot diameter of the laser light increases, the diameter of the build-up product increases as well, and the risk of generating smear increases. Therefore, as the TOP is becomes larger, the cleaning interval for the build-up product needs to be shorter.

Figure 5:
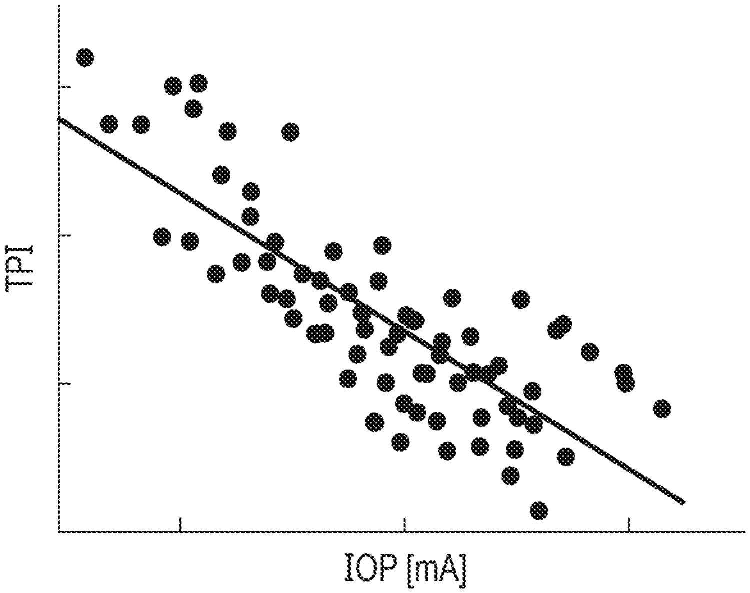
FIG. 5 is a diagram showing a correlation between a drive current setting value IOP and a track density TPI.

FIG. 5 is a diagram showing the correlation between the drive current setting value IOP and the track density TPI. As shown in the figure, the IOP and TPI are inversely proportional to each other, and therefore as the track density TPI becomes lower, the cleaning interval needs to be shorter.

Figure 6:
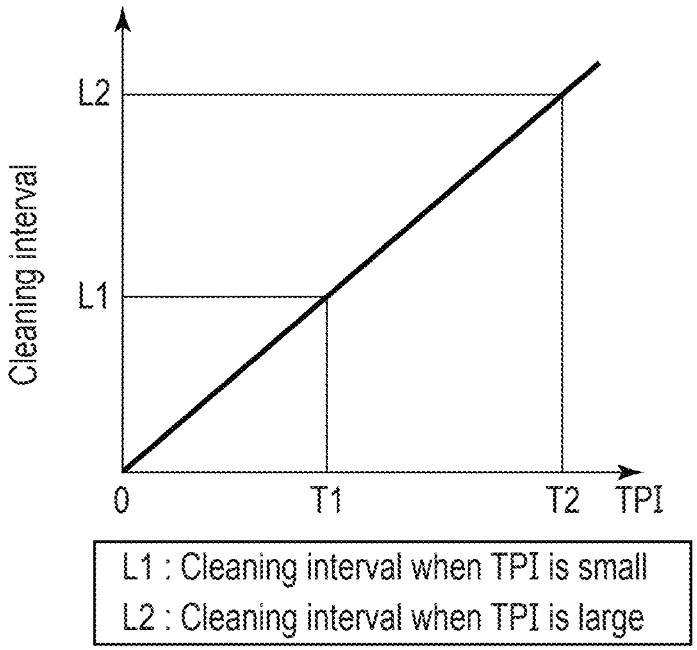
FIG. 6 is a diagram showing a relationship between a cleaning interval and a track density (TPI).
Figure 7:
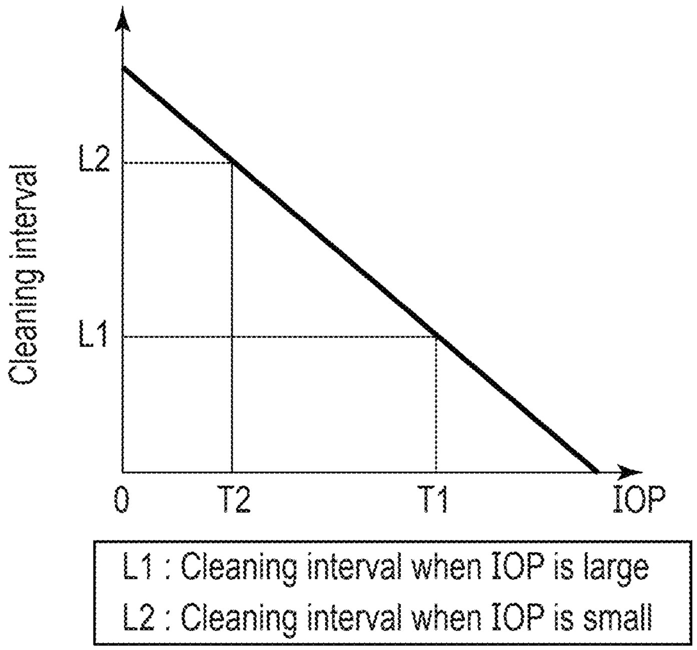
FIG. 7 is a diagram showing a relationship between the cleaning interval and the laser drive current setting value (IOP).

FIG. 6 is a diagram showing the relationship between the cleaning interval L and the track density TPI, and FIG. 7 is a diagram showing the relationship between the cleaning interval L and the laser drive current setting value IOP.

As shown in FIG. 6, as the TPI becomes higher, the cleaning interval is set to be longer. In one example, when the TPI is low (T1), the cleaning interval is set to L1, and when the TPI is high (T2), the cleaning interval is set to L2 (>L1).

As shown in FIG. 7, as the IOP becomes higher, the cleaning interval L is set to be shorter. In one example, when the IOP is high (T1), the cleaning interval is set to L1, and when the IOP is high (T2), the cleaning interval is set to L2 (>L1).

Further, the method of setting the cleaning interval L will be explained.

The build-up product HM increases in size over time after it is generated, and due to friction with the magnetic disk, operations of the magnetic head such as positioning and the like may be affected.

Figure 8:
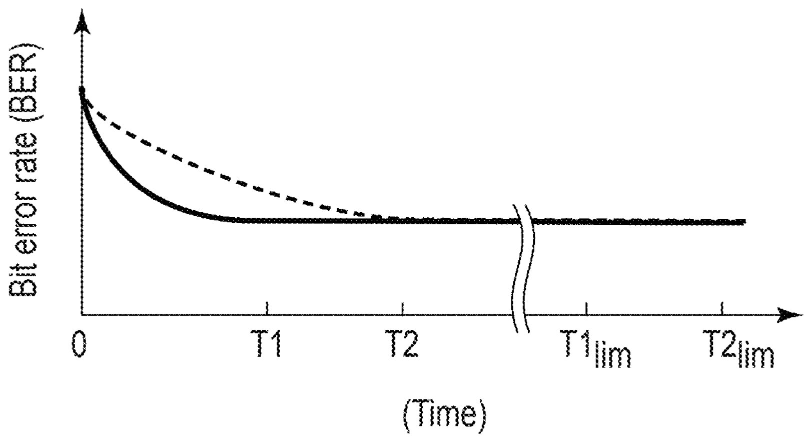
FIG. 8 is a diagram showing a relationship between a head operating time and a bit error rate (BER).
Figure 9:
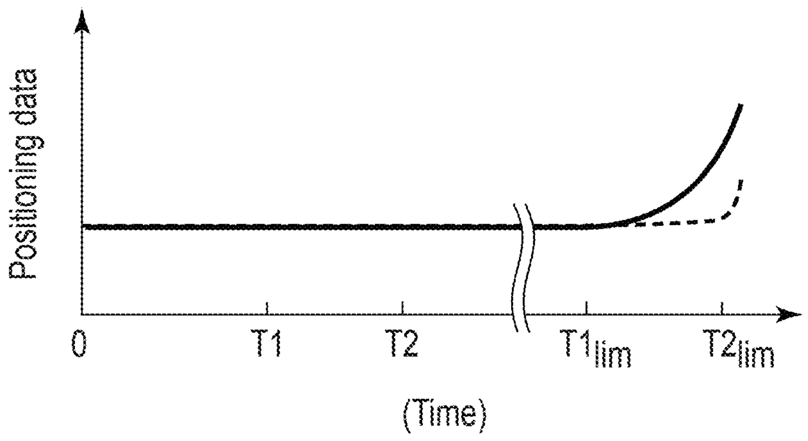
FIG. 9 is a diagram showing a relationship between the head operating time and a positioning accuracy of the magnetic head.

FIG. 8 is a diagram showing the relationship between the write operation time from the initial state of the magnetic head and the bit error rate (BER), and FIG. 9 is a diagram showing the relationship between the write operation time from the initial state of the magnetic head and the positioning accuracy of the magnetic head. In each of the figures, solid lines indicate the relationship when the build-up generation speed T is fast, and broken lines indicate the relationship when the build-up generation speed T is slow.

As shown in FIG. 8, when the build-up generation speed T is fast, the bit error rate improves quickly. That is, it can be understood that as the build-up generation speed T is faster, the build-up product HM contributes more to the improvement of the write performance. On the other hand, as shown in FIG. 9, when the build-up generation speed T is fast, degradation of positioning as well occurs quickly. The reason for this is that when the build-up product grows to have a certain area in excess, friction is caused between the magnetic head and the magnetic disk, which interferes with the smooth operation of the magnetic head and degrades the positioning.

In FIG. 9, the time limit for deterioration to occur when the build-up generation speed T is fast is represented as T1lim, and the time limit for deterioration to occur when the build-up generation speed T is slow is represented as T2lim.

For IOP and TPI, Tlim can be expressed by a relationship formula such as Tlim=p×IOP+q or Tlim=s×TPI+t.

Here, the cleaning interval L of a magnetic head is determined by a value on which the variation is taken into account from the time Tlim at when the positioning deteriorates. For example, the cleaning interval is determined by a value of, for example, L=Tlim×0.8.

From the above-provided relationships, the cleaning interval L can be expressed by a linear equation such as: L=aT×b using the build-up generation speed T. Here, the coefficients a and b can be obtained using the least squares method from a plurality of cleaning intervals Lx and build-up generation speeds Tx.

Further, the cleaning interval L may be set based on the operating time when the power of the HDD is on. For example, the setting circuit 46*e* sets an arbitrary reference cumulative operating time as the cleaning interval L and registers it in the memory 47. The calculation circuit 46*i* of the main controller 40 monitors the operating time of the HDD 10, and calculates and accumulates the operating time to obtain the accumulated operating time, which is then registered in the memory 47. The determination circuit 46*f* of the main controller 40 determines whether or not the accumulated operating time of the HDD 10 has reached the standard accumulated operating time, and when the standard accumulated operating time is reached, it instructs the cleaning execution circuit 46*g* to execute the cleaning.

Furthermore, the cleaning interval L can as well be set based on the total accumulated time of the write operation of each of the respective magnetic heads. For example, the setting circuit 46*e* sets an arbitrary standard accumulated operation time as the cleaning interval L and registers it in the memory 47. The calculation circuit 46*i* of the main controller 40 calculates and accumulates the write operation time of each of the respective magnetic heads 16 to obtain the total accumulated operation time and registers it in the memory 47. The determination circuit 46*f* of the main controller 40 determines whether or not the total accumulated operation time of the write operation of each respective magnetic head 16 has reached the set standard accumulated operation time, and when the standard accumulated operation time is reached, it instructs the cleaning execution circuit 46*g* to execute cleaning of the respective magnetic head.

In this case, the total operation time for write operation differs from one magnetic head to another, and therefore the main controller 40 checks the total operation time for write operations for each magnetic head registered in the memory 47 at regular intervals, and performs cleaning in order of the magnetic heads whose total operation time exceeds the standard total operation time. When the time of a certain magnetic head reaches the cleaning interval L, cleaning may be performed on one corresponding magnetic head, or cleaning may be performed on a plurality of magnetic heads or all magnetic heads.

In addition, in the recording area of the magnetic disk 12, the laser drive current setting value IOP during write operations may differ between zones, that is, the laser drive current setting value IOP may differ from one radius position to another on the magnetic head 16 relative to the magnetic disk 12. Therefore, in calculating the write operation accumulation time, a weight may be assigned to the laser drive current setting value IOP for each zone or radius position. For example, the write operation accumulation time can be calculated using the following formula:

$$\text{Buildup Accumlation Time} = \int_{t1}^{t2} f(IOP) \times \text{writing time dt}$$

where f (IOP) is a function that depends on IOP (for example, a linear function of IOP). Alternatively, the formula can be expressed using TPI instead of IOP. Since the optimal value of IOP differs from one magnetic head/disk to another, when calculating using IOP, it is necessary to have this function for all magnetic heads. When using TPI, it is possible to generalize the function.

Next, an example of the cleaning operation for the build-up product HM will be explained.

The cleaning of the build-up product HM is performed by the following procedure. That is, the flying height of the magnetic head 16 is reduced from the flying amount of the magnetic head 16 during normal write operation, so as to bring the build-up product HM into contact with the surface of the magnetic disk for abrasion. Such a method may be as follows. For example, when the set value for the flying height during normal operation is 1 nm, the flying height is reduced to 0.5 nm during cleaning and held for about 1 second, etc.

The reduction in the flying height can take various values, not limited to 0.5 nm, such as lowering the magnetic head until it touches the surface of the magnetic disk (touchdown) or lowering the magnetic head further from the touchdown position by +a few angstroms (over-push).

Generally, when the flying height is maintained at a high level, the cleaning effect is weak, whereas when the magnetic head touches down, sufficient cleaning effect can be obtained. If more thorough cleaning should be performed, the magnetic head may be pushed to the magnetic disk side by a few angstroms (over-push) beyond the touchdown position. Alternatively, one or more touchdowns, where the magnetic head is brought into contact with the magnetic disk may be performed for the cleaning.

Note that the cleaning operation time is not limited to one second, and can be increased or decreased as desired depending on the cleaning conditions.

Since the cleaning of the product itself does not generate heat or does not erase the recorded data, the cleaning can be performed in the data recording area. Alternatively, in order to avoid the risk of the magnetic head becoming contaminated due to the material created by the abrasion that may be generated during the cleaning process, dedicated cleaning areas R1 and R2 (see FIG. 1) can be provided in the non-data recording areas of the magnetic disk 12, for example, in the innermost and outermost areas. Further, in the case of the shingled magnetic recording (SMR) method, a dedicated cleaning area may be provided in the inter-band area of the recording track.

After the cleaning operation is complete, the HDD 10 of this embodiment executes regeneration of the build-up product HM. That is, after the cleaning operation is complete, the drive circuit 46*h* of the main controller 40 sets the heater drive power back to the value of the heater drive power during normal write operation under the control of the heater control unit 46*c*, and sets the flying height of the magnetic head 16 to d1. At the same time, the drive circuit 46*h* supplies the laser drive current to the LDU 25 under the control of the light source control unit 46*d*, and generates the near-field light from the near-field light-emitting element 65. With this operation, the lubricant on the magnetic disk 12 is wound up and filled between the magnetic head and the surface of the magnetic disk, thus regenerating the build-up product HM. The generation takes place over a period of several milliseconds to several hours, depending on the conditions of the laser light and the lubricant, from the moment the near-field light is applied. Thus, the build-up product HM is generated, which has grown to a height substantially the same as the flying height d1 of the magnetic head 16.

In order to generate the build-up product HM, it is necessary to apply laser light and heat the magnetic disk 12 to a high temperature, but a recording current need not necessarily be supplied to the magnetic head 16. That is, the regeneration of the build-up product HM is done by making the magnetic head 16 perform seek operations or write operations while laser light (near-field light) is being applied.

The regeneration of the build-up product HM may be performed by providing a dedicated area for the regeneration in the data recording area or in the non-data recording areas of the magnetic disk 12, for example, in the innermost and outermost areas. Further, in the case of the shingled recording method (SMR), a dedicated area for regeneration may be provided in the inter-band area of the recording track.

The regeneration of the build-up product and the cleaning process may be performed in different dedicated areas or in the same dedicated area.

While laser light is being applied, when the temperature of the magnetic disk 12 exceeds the Curie temperature, there is a possibility that the recorded pattern will disappear. For this reason, when generating a build-up product HM in the data recording area of the magnetic disk 12, it is desirable to use the area that is scheduled for rewriting or to write the same pattern as that which has already been recorded.

An example of the overall operation of the HDD configured as described above will be explained.

Figure 10:
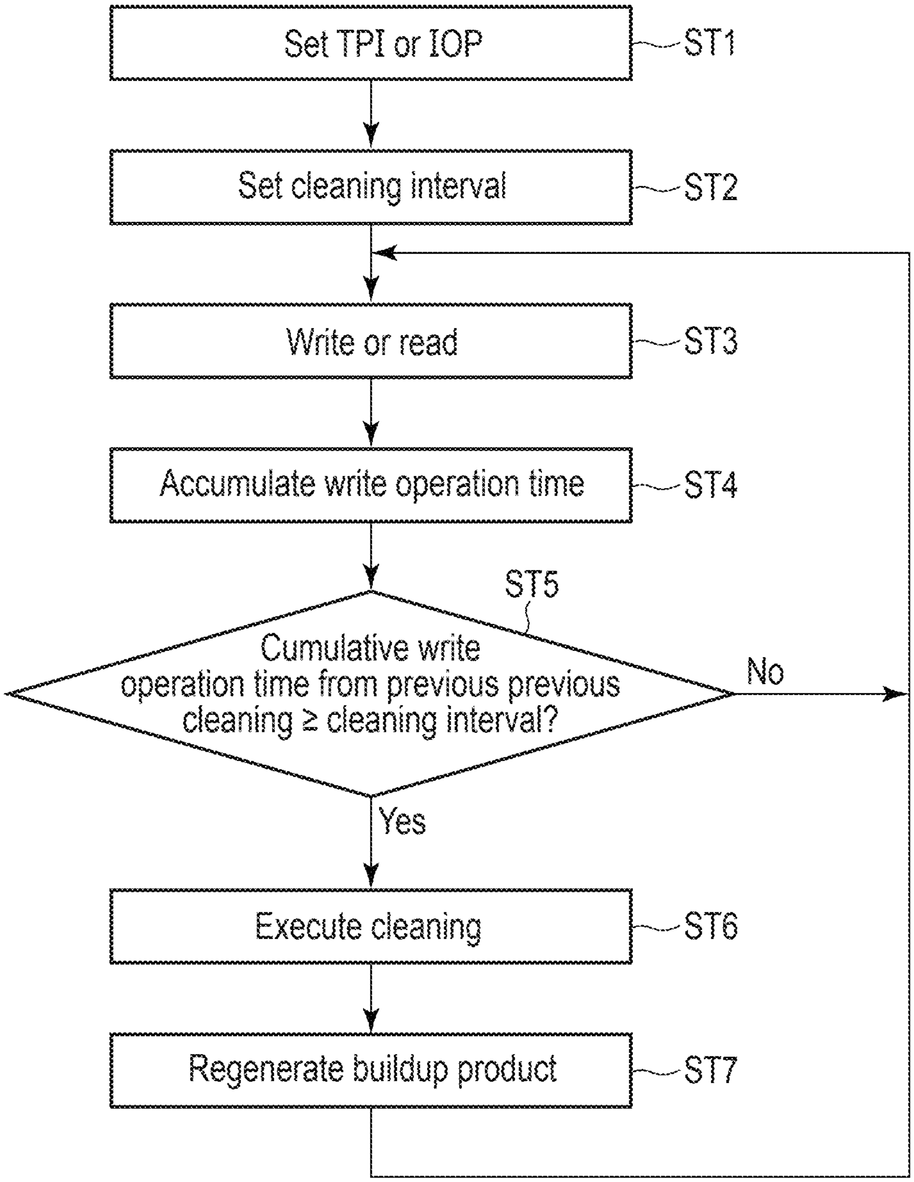
FIG. 10 is a flowchart showing an example of an operation of the HDD.
Figure 11:
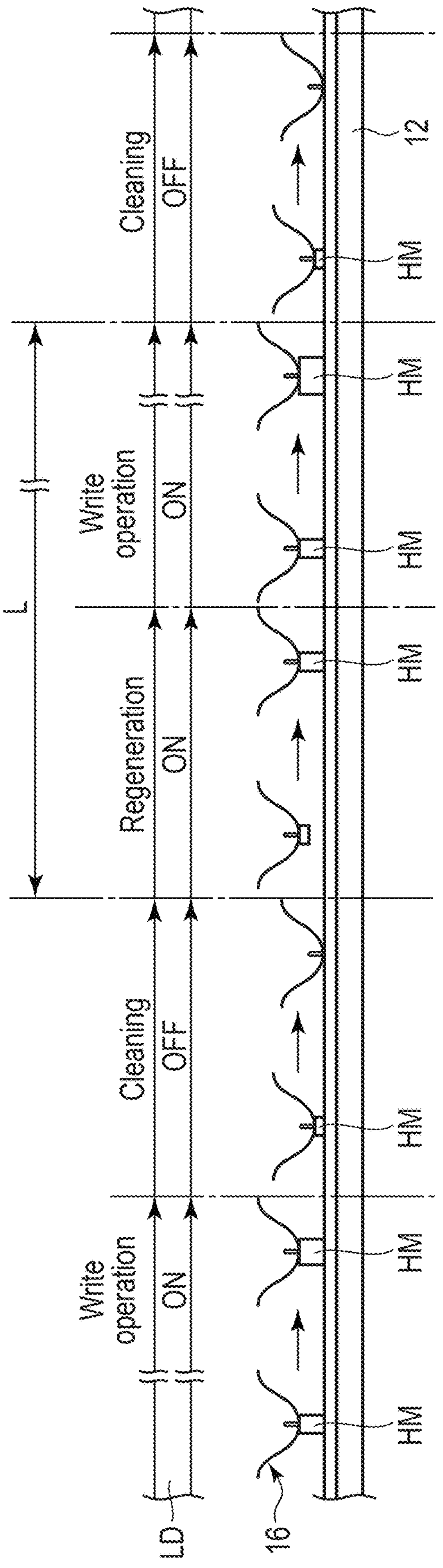
FIG. 11 is a diagram schematically showing the operation of the magnetic head corresponding to an operation state of the HDD.

FIG. 10 is a flowchart showing an example of the operation of the HDD, and FIG. 11 is a diagram schematically showing the operation of the magnetic head corresponding to the operating state of the HDD.

As shown in FIG. 10, in the manufacturing or adjustment step, the main controller 40 of the HDD 10 first sets at least one or both of the laser drive current setting value IOP and the track density TPI described above (ST1). Usually, with the track density TPI and BPI, the areal recording density of the magnetic disk 12 is determined, and the TPI and BPI that maximize the areal recording density are set. In the HDD 10 of this embodiment, the setting circuit 46*e* adjusts the optimal value of the laser drive current setting value IOP at the same time as that for the TPI and BPI, and stores the optimized values in the memory 47.

Next, the setting circuit 46*e* of the main controller 40 sets the execution interval of the cleaning operation for the product HM, that is, the interval between the end of cleaning and the start of the next cleaning operation (cleaning interval L) (ST2). For example, the setting circuit 46*e* sets an arbitrary standard cumulative operation time (for example, several minutes to several tens of hours) as the cleaning interval L, targeting the write operation time of the magnetic head, and registers it in the memory 47.

As described above, the setting time for the cleaning interval L is not limited to the cumulative write operation time of the magnetic head, but may as well be set as a reference cumulative operating time that targets the operating time while the HDD power is on. Further, the cleaning interval (time) L can be set as well based on at least one of the set laser drive current setting value IOP and track density TPI.

As shown in FIGS. 10 and 11, during the operating period when the power of the HDD 10 is on, the main controller 40 executes write and read operations in response to instructions from the host 45 (ST3). Further, the calculation circuit 46*i* of the main controller 40 calculates and accumulates the write operation time of each magnetic head 16, and sequentially registers the accumulated results in the memory 47 (ST4). Furthermore, the calculation circuit 46*i* calculates and accumulates the operating time of the HDD 10 and registers the result in the memory 47.

While the HDD 10 is operating, the determination circuit 46*f* of the MPU 46 monitors the accumulated operating time of each magnetic head 16 and determines whether or not the accumulated operating time since the end of the previous cleaning has reached the standard accumulated operating time (cleaning interval L) (ST5). The determination circuit 46*f* continues to monitor and accumulate the write operation time until the accumulated operation time reaches the cleaning interval L.

At the time when the accumulated operation time reaches the standard accumulated operation time (cleaning interval L), the determination circuit 46*f* commands the cleaning execution circuit 46*g* to execute the cleaning operation and resets the registered accumulated operation time.

The cleaning execution circuit 46*g* starts the cleaning operation in response to the command (ST6). The cleaning execution circuit 46*g* increases the drive current value of the first heater 76*a* under the control of the heater control unit 46*c* and the heater power supply circuit 30*b*, and reduces the flying height of the magnetic head 16. In one example, until the magnetic head 16 touches down on the surface of the magnetic disk 12, the heater drive current is increased, and this state is maintained for a few seconds, for example, 1 to 2 seconds. With this operation, the build-up product HM attached to the magnetic head 16 can be removed as it is abraded away by friction with the surface of the magnetic disk.

As described above, the flying height of the magnetic head during cleaning can be adjusted as desired. Note here that the set value for the flying height during normal write operation is 1 nm, and during cleaning, it can be lowered to 0.5 nm, or the head can be pushed in (over-pushed) by a few angstroms further from the touchdown position. Further, the cleaning operation does not have to be performed only once, but can be performed a plurality of times in succession.

After the cleaning is complete, the main controller 40 executes the regeneration of the build-up product (ST7). That is, the MPU 46, under the control of the heater control unit 46*c*, sets the heater drive power value back to the heater drive power value during normal write operation, and sets the flying height of the magnetic head 16 to d1. At approximately the same time, the MPU 46 supplies laser drive current to the LDU 25 of the magnetic head 16 under the control of the write control unit 46*a*, and generates near-field light from the near-field light-emitting element 65. With this operation, the lubricant on the magnetic disk 12 is wound up and filled between the magnetic head and the surface of the magnetic disk, thereby regenerating the build-up product HM. The regeneration process takes a few milliseconds to a few hours, for example, from the moment the near-field light is applied. Thus, a buildup product HM is generated, which has grown to have a height substantially the same as the flying height d1 of the magnetic head 16.

Thereafter, the main controller 40 executes write and read operations in response to instructions from the host 45, and also repeatedly executes the processing operations ST3 to ST7 described above.

Examples of the setting of the cleaning interval L and the cleaning operation will be provided.

Example 1

Twenty HDDs were prepared, ten of which were set to have a cleaning process as an example, and ten of which were set to have no cleaning process (interval L was set to infinity) as a comparison example. After measuring the bit error rate (BER) and positioning information at the initial state, the HDDs were run for 500 hours.

The magnetic heads were cleaned at the same timing for all heads, once every 20 hours of actual HDD operation. The cleaning operation was performed by lowering the flying height of the magnetic head during write operations to 0.5 nm and holding it for one second in the recording area.

After 500 hours of running, the positioning accuracy and BER of the HDDs with and without cleaning were checked, and it was found that both types of the HDDs were equivalent or improved in terms of BER, while the positioning of the HDDs without cleaning deteriorated significantly. From these results, it has been confirmed that the deterioration of positioning can be suppressed by performing the cleaning.

Example 2

Twenty HDDs were prepared, ten of which were set as examples with cleaning, and ten of which were set as comparative examples without the cleaning process (interval L set to infinity). The initial bit error rate (BER) and positioning accuracy information at the initial state were measured and then they were run for 1,000 hours. The cleaning interval for the magnetic heads was set to the time based on the IOP set value.

In one example, the cleaning interval was set as follows:

when IOP>10 mA, the interval as set to 1.2·IOP (mA)−1 hour; and when IOP≤10 mA, it was set to 2 hours.

The cleaning was started when the write operation time of the magnetic head in each case reached the set time.

The cleaning was performed by lowering the flying height during the write operation of the magnetic head to 0 nm (touchdown state) and holding it for 2 seconds. Further, for cleaning, the location closest to the head position at that time in the inter-band area during SMR recording was used.

After 1,000 hours of running, the positioning accuracy and BER of the HDDs with and without cleaning were checked, and it was found that both types of the HDDs were equivalent or improved in terms of BER, while the positioning of the HDDs without cleaning deteriorated significantly. From these results, it has been confirmed that the deterioration of positioning can be suppressed by performing the cleaning.

Example 3

Twenty HDDs were prepared, ten of which were set as an example with cleaning, and ten of which were set as a comparison example without a cleaning process (interval L set to infinity). The bit error rate (BER) and positioning accuracy information at the initial state were measured, and then they were run for 5000 hours. The cleaning interval of the magnetic heads was set to the time based on the TPI setting value.

In one example, the cleaning interval was set as follows, that is, where the TPI setting value (kTPI) is represented by X, the interval was set to X×0.1−50 hours when X>510, and it was set to 1 hour when X≤510. The cleaning was performed at the timing when the write operation time of the magnetic head reached the set time in each case.

The cleaning was performed by lowering the flying height during the write operation of the magnetic head to +0.5 nm with respect to the touchdown point (over-push state) and holding it for 0.5 seconds. Further, for the cleaning, the dedicated cleaning area R2, which is located at the outermost circumference outside the recording area, was used.

After 1,000 hours of running, the positioning accuracy of the magnetic head and the BER were checked for each of the HDDs with and without cleaning, and it has been found that both types of HDDs were equivalent or improved in terms of BER, while the positioning of the HDD without cleaning deteriorated significantly. From these results, it has been confirmed that the deterioration of positioning can be suppressed by performing the cleaning.

As described above, according to the HDD of the first embodiment configured as described above, the build-up product HM is cleaned, that is, removed for each pre-set cleaning interval L, and thus the occurrence of the decrease in head positioning accuracy and decrease in recording density and the like due to the enlargement of the build-up product HM can be prevented. From the above, according to the present embodiments, it is possible to obtain a magnetic recording device that can prevent failures due to the build-up product and improve the recording density.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Further, for example, the cleaning interval L is not limited to the reference cumulative operating time of the magnetic head indicated in the embodiment, but the reference cumulative operating time based on the operating time of the HDD, or the time set based on the laser drive current setting value IOP and track density TPI may as well applied.

The flying height of the magnetic head in the cleaning is not limited to 0.5 nm, 0 nm or 0 to several angstroms, but it can be set to an arbitrary value. The time period and the number of times of cleaning can be varied as appropriate in accordance with necessity.

What is claimed is:

1. A magnetic disk device comprising:

a disk-shaped recording medium including a recording surface on which a lubricant is applied;

a magnetic head including a recording element, a light source, and a light emitting element which irradiates light onto the recording surface of the recording medium; and a controller including a light source control circuit which controls a drive current value of the light source, a cleaning execution circuit which executes a cleaning operation to remove a build-up product attached to the magnetic head, and a setting circuit which sets a cleaning interval at which the cleaning operation is executed.

2. The device of claim 1, wherein the setting circuit is configured to set the cleaning interval in accordance with at least one of a drive current setting value (IOP) of the light source and a track density (TPI) of the recording medium.

3. The device of claim 2, wherein the setting circuit is configured to set the cleaning interval to be shorter as the drive current setting value (IOP) of the light source is larger.

4. The device of claim 2, wherein the setting circuit is configured to set the cleaning interval to be shorter as the track density (TPI) is smaller.

5. The device of claim 1, wherein the setting circuit sets a reference cumulative operating time of a write operation of the magnetic head to the cleaning interval, and the controller comprises a calculation circuit which accumulates an operating time of the write operation of the magnetic head, a determination circuit which compares the accumulated operating time with the set reference cumulative operating time and starts the cleaning operation when the accumulated operating time reaches the reference cumulative operating time.

6. The device of claim 1, wherein the setting circuit sets a reference cumulative operating time of the magnetic recording device to the cleaning interval, and the controller comprises a calculation circuit which accumulates an operating time of the magnetic recording device and a determination circuit which compares the accumulated operating time with the set reference cumulative operating time and starts the cleaning operation when the accumulated operating time reaches the reference cumulative operating time.

7. The device of claim 1, wherein the cleaning execution circuit is configured to execute cleaning while reducing the flying amount of the magnetic head as compared to the flying amount during a write operation of the magnetic head.

8. The device of claim 1, wherein the cleaning execution circuit is configured to execute cleaning by bringing the magnetic head into contact with the recording surface of the recording medium.

9. The device of claim 1, wherein the cleaning execution circuit is configured to execute the cleaning operation in a non-data-recording area of an innermost or outermost circumference of the recording medium.

10. The device of claim 1, wherein the cleaning execution circuit is configured to execute the cleaning operation in an area between bands of shingled recording data in a data recording area of the recording medium.

11. The device of claim 1, wherein the cleaning execution circuit includes a drive circuit which executes regeneration of the build-up product after the cleaning operation is completed.

* * * * *